(12) United States Patent
Bloomfield et al.

(10) Patent No.: US 12,730,091 B2
(45) Date of Patent: Sep. 8, 2026

(54) METHOD AND SYSTEMS FOR ANALYZING IONS USING DIFFERENTIAL MOBILITY SPECTROMETRY AND ION GUIDE COMPRISING ADDITIONAL AUXILIARY ELECTRODES

(71) Applicant: DH Technologies Development Pte. Ltd., Singapore (SG)

(72) Inventors: Nicholas G. Bloomfield, Newmarket (CA); Igor Chernushevich, Toronto (CA); Yves Le Blanc, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 183 days.

(21) Appl. No.: 18/722,014

(22) PCT Filed: Dec. 13, 2022

(86) PCT No.: PCT/IB2022/062148

§ 371 (c)(1),
(2) Date: Jun. 20, 2024

(87) PCT Pub. No.: WO2023/119062

PCT Pub. Date: Jun. 29, 2023

(65) Prior Publication Data

US 2025/0130199 A1 Apr. 24, 2025

Related U.S. Application Data

(60) Provisional application No. 63/292,300, filed on Dec. 21, 2021.

(51) Int. Cl.
*G01N 27/623* (2021.01)
*G01N 27/624* (2021.01)
(Continued)

(52) U.S. Cl.
CPC ......... *G01N 27/623* (2021.01); *G01N 27/624* (2013.01); *H01J 49/063* (2013.01); *H01J 49/24* (2013.01)

(58) Field of Classification Search
CPC ... G01N 27/623; G01N 27/624; H01J 49/063; H01J 49/24; H01J 49/0031; H01J 49/004
(Continued)

(56) References Cited

U.S. PATENT DOCUMENTS

2014/0353491 A1* 12/2014 Hager .................. H01J 49/063 250/288
2015/0170896 A1* 6/2015 Green .................. H01J 49/065 250/281

(Continued)

FOREIGN PATENT DOCUMENTS

WO 2008068515 A2 6/2008
WO 2013098613 A1 7/2013
WO 2021156775 A1 8/2021

OTHER PUBLICATIONS

International Search Report and Written Opinion, PCT/IB2022/062148, dated Mar. 1, 2023, 15 pages.

*Primary Examiner* — Arleen M Vazquez
*Assistant Examiner* — Robert P Alejnikov, Jr.
(74) *Attorney, Agent, or Firm* — Potomac Law Group, PLLC; Reza Mollaaghababa; Brian Hairston

(57) ABSTRACT

Methods and systems for performing differential mobility spectrometry-mass spectrometry (DMS-MIS) are provided herein. In various aspects, methods and systems described may be effective to improve the performance of a differential mobility spectrometry device and a MS device operating in tandem relative to conventional systems for DMS-MS. In certain aspects, methods and systems in accordance with the present teachings utilize an ion guide which comprises a multipole rod set and a plurality of auxiliary electrodes to
(Continued)

which a DC voltage is applied during transmission of ions through the ion guide so as to generate an axial electric field along a longitudinal axis of the ion guide to accelerate the ions toward the outlet end of the ion guide. This may significantly reduce a pause duration between the application of different compensation voltage values without substantially increasing the likelihood of contamination or cross-talk between groups of ions transmitted by the differential mobility spectrometry device at each compensation voltage value.

20 Claims, 7 Drawing Sheets

(51) Int. Cl.
*H01J 49/06* (2006.01)
*H01J 49/24* (2006.01)

(58) Field of Classification Search
USPC .......................................................... 324/464
See application file for complete search history.

(56) References Cited

U.S. PATENT DOCUMENTS

2017/0336356 A1* 11/2017 Covey ..................... H01J 49/24
2021/0063350 A1* 3/2021 Giles .................... G01N 27/624
2021/0247359 A1* 8/2021 Prasad ................. G01N 27/622
2023/0288372 A1* 9/2023 Bedford ............... G01N 27/624

* cited by examiner

342
X
346a
346d
Y
Z
346c
346b

METHOD AND SYSTEMS FOR ANALYZING IONS USING DIFFERENTIAL MOBILITY SPECTROMETRY AND ION GUIDE COMPRISING ADDITIONAL AUXILIARY ELECTRODES

RELATED APPLICATIONS

This application is a 35 U.S.C. § 371 national stage filing of International Application No. PCT/IB2022/062148, filed on Dec. 13, 2022, which claims priority to U.S. Provisional Application No. 63/292,300 filed on Dec. 21, 2021, the contents of both of which are incorporated herein in their entirety.

FIELD

The present teachings generally relate to methods and systems of analyzing ions utilizing differential mobility spectrometry and mass spectrometry (MS).

BACKGROUND

Mass spectrometry (MS) is an analytical technique for measuring the mass-to-charge ratios (m/z) of molecules within a sample, with both quantitative and qualitative applications. For example, mass spectrometry can be used to identify unknown compounds in a test substance, determine the isotopic composition of elements in a specific molecule, determine the structure of a particular compound by observing its fragmentation, and/or quantify the amount of a particular compound in a test sample. MS typically involves converting the sample molecules into ions using an ion source and separating and detecting the ionized molecules with electric and/or magnetic fields due to differences in their mass-to-charge ratios (m/z) using one or more mass analyzers. Depending on the experiment, ions generated by the ion source may be detected intact (generally referred to as MS) or alternatively may be subject to fragmentation as in tandem MS (also referred to as MS/MS or $MS^2$) such that product ions resulting from the fragmentation of selected precursor ions may additionally or alternatively be detected.

Whereas MS typically separates ions based on their m/z at very low operating pressures (often as low as $10^{-5}$ Torr or lower), ion mobility based analytical techniques instead separate and analyze ions based upon differences in their mobility through a relatively high pressure gas. One example of such ion-mobility based techniques is differential mobility spectrometry in which a differential mobility spectrometer separates ions on the basis of an alpha parameter, which is related to the differences in the ion mobility coefficient in varying strengths of electric field. In some known differential mobility spectrometers, RF voltages (commonly referred to as separation voltages (SV) or dispersion voltages) are applied across the drift tube in a direction perpendicular to that of the drift gas flow. Ions of a given species tend to migrate radially away from the axis of the transport chamber by a characteristic amount during each cycle of the RF waveform due to differences in mobility during the high field and low field portions. A DC potential, commonly referred to as a compensation voltage (COV or also CV), is applied to the differential mobility spectrometer and provides a counterbalancing electrostatic force to that of the SV. The COV can be tuned so as to preferentially prevent the drift of one or more species of ions of interest. Depending on the application, the COV can be set to a fixed value to pass only ion species with a particular differential mobility while the remaining species of ions drift toward the electrodes and are neutralized. Alternatively, if the COV is scanned for a fixed SV as a sample is introduced continuously into the differential mobility spectrometer, a mobility spectrum can be produced as the differential mobility spectrometer transmits ions of different differential mobilities. Examples of known differential mobility spectrometers are described in U.S. Pat. Nos. 8,084,736 and 9,835,588, the teachings of which are hereby incorporated by reference in their entireties. Differential mobility spectrometry devices that utilize curved ion paths are also known. For clarity the term, COV and CV as described are intended to refer to the same differential mobility parameter and are used interchangeably herein. Likewise, the terms separation voltage and dispersion voltage are intended to refer to the same differential mobility parameter and are used interchangeably herein.

While differential mobility spectrometry may be used on its own to analyze a sample, a differential mobility spectrometer may also be interfaced with a mass spectrometer to serve as a front end orthogonal separation method, thus taking advantage of the atmospheric pressure, gas phase, and continuous ion separation capabilities of differential mobility spectrometry to provide enhanced analytical power to the differential mobility spectrometry-MS system. Such a differential mobility spectrometry-MS system may enhance numerous areas of sample analysis, including proteomics, peptide/protein conformation, pharmacokinetic, metabolism analysis, trace level explosives detection, and petroleum monitoring, all by way of non-limiting example.

There remains a need for improved differential mobility-MS methods and systems.

SUMMARY

The present teachings are generally directed to improved methods and systems for performing differential mobility spectrometry in combination with MS. In conventional workflows in which differential mobility spectrometry is utilized prior to MS analysis, a user typically iteratively adjusts the COV applied (e.g., ramps stepwise) across the electrodes of the differential mobility spectrometry device to allow for transmission therethrough of different subsets of ions varying in their differential mobility across the COV range. Such transmitted ions are then passed through downstream ion optics disposed in one or more vacuum chambers, where they may be subjected to further processing (e.g., mass analysis). A significant pause (e.g., ~20-30 milliseconds) may be conventionally provided between the application of different COV values to the differential mobility spectrometry device in order to avoid cross-talk between groups of ions transmitted at each COV value, thereby reducing the duty cycle of the analysis and reducing the number of data points that can be obtained during a given time period. By way of example, when the sample comprises the eluent of a liquid chromatography (LC), particular analytes within the sample may be eluted only during a finite window (e.g., during an LC peak). Due to the decreased duty cycle caused by the extended pause when switching COV values, conventional systems typically utilize a narrow COV range and/or large COV step sizes so as to maintain a sufficient number of data points across each LC peak.

In accordance with various aspects of the present teachings, methods and systems described herein may improve the duty cycle of differential mobility spectrometry-MS analysis, thereby enabling the collection of an increased number data points on the LC time scale, enabling a wider range of COV to be applied to the differential mobility spectrometry device, and/or to allow smaller COV step sizes to be applied relative to conventional methods and systems.

In certain aspects, a method of analyzing ions is provided comprising receiving in an ion guide a first plurality of ions transmitted from a differential mobility spectrometry device while having a first combination of separation voltage (SV) and compensation voltage (COV) applied thereto, wherein the ion guide comprises a multipole rod set extending along a longitudinal axis from an inlet end to an outlet end and a plurality of auxiliary electrodes. Thereafter, a second plurality of ions may be received in the ion guide, the second plurality of ions being transmitted by the differential mobility spectrometry device while having a second combination of SV and COV applied thereto, wherein at least one of the SV and COV in the second combination differs from the SV and COV in the first combination. While said first and second plurality of ions are being transmitted through the ion guide, a DC voltage may be applied to the auxiliary electrodes so as to generate an axial electric field along a longitudinal axis of the ion guide.

In various aspects, a duration between terminating transmission of the first plurality of ions and initiating transmission of the second plurality of ions may be less than about 30 ms. By way of non-limiting example, in some aspects, the duration between receiving successive first and second plurality of ions at an inlet of the ion guide may be less than about 10 ms (e.g., about 4 ms).

The ion guide may be operated at a range of pressures, for example, in some aspects, the ion guide may disposed within a vacuum chamber having a pressure in the millitorr (mTorr) range.

In certain aspects, the ion guide can be configured depending on the configuration of the differential mobility spectrometry device. For example, the differential mobility spectrometry device may be operated in an "enabled mode" as noted above in which a SV-COV combination is applied thereto such that only certain ions exhibiting a particular ion mobility (or range of ion mobilities) are transmitted through the differential mobility spectrometry device. Alternatively, the differential mobility spectrometry device may be adjusted from "enabled mode" to operate in a "transmission mode" in which ion mobility filtering is disabled prior to the transmitted ions being received by the ion guide. That is, in transmission mode, the differential mobility spectrometry device may be operated such that substantially all ions received from an ion source are transmitted to the downstream ion guide. In various aspects, the signals provided to the auxiliary electrodes may be adjusted depending on whether the differential mobility spectrometry device is filtering ions based on their mobilities, for example, whether the differential spectrometry device is being operated in "transmission mode" or "enabled mode." By way of example, when the differential mobility spectrometer is operating in "transmission mode," the auxiliary electrodes may have a signal applied thereto such that the auxiliary electrodes do not generate an axial electric field along the longitudinal axis of the ion guide. By way of example, the auxiliary electrodes may be operated at the offset potential of the multipole rods. Upon enabling the differential mobility spectrometry device, however, the signal applied to the auxiliary electrodes may be adjusted (e.g., by applying a DC voltage) such that an axial electric field is generated by the auxiliary electrodes. It will be appreciated that the differential mobility spectrometry device can also be considered to essentially operate in "transmission mode" when low values of SV (e.g., less than a few hundreds of volts) and COV (e.g., less than 1V) results in no substantial separation for many of the ions generated by the source.

In some aspects, switching the differential mobility spectrometry device between transmission mode and enabled mode can include adjusting potentials applied to other elements utilized with the ion guide. For example, in various aspects, a lens may be disposed adjacent the outlet end of the ion guide. In such cases, when operating the differential mobility spectrometry device in enabled mode, the method may comprise adjusting a potential on the lens to be more attractive to the ions relative to an offset of the multipole rod set of the ion guide.

The ion guide can have a variety of configurations. By way of example, in certain aspects, the multipole rod set of the ion guide may comprise quadrupole rod set comprising a first pair of rods and a second pair of rods, wherein the rods of the quadrupole rod set are spaced apart from the longitudinal axis such that the rods of each pair are disposed on opposed sides of the longitudinal axis. Additionally, the plurality of auxiliary electrodes may comprise at least a pair of auxiliary electrodes extending along the longitudinal axis on opposed sides thereof, wherein each of the auxiliary electrodes is interposed between a single rod of the first pair of rods and a single rod of the second pair of rods.

The auxiliary electrodes can have a variety of shapes, but in some aspects, are generally configured to generate an axial electric field within the ion guide. For example, in some aspects, the auxiliary electrodes have a T-shaped cross-sectional shape.

In certain aspects, a mass spectrometry system is provided, the system comprising a differential mobility spectrometry device, wherein when activated, the differential mobility spectrometry device is configured to separate ions based on their differential mobilities. The system may also comprise an ion guide configured to receive ions from the differential mobility spectrometry device, wherein the ion guide comprises a multipole rod set extending along a longitudinal axis from an inlet end to an outlet end and a plurality of auxiliary electrodes. The system may also comprise a control system operatively coupled to the differential mobility spectrometry device and the ion guide, the control system configured to: cause a first combination of separation voltage (SV) and compensation voltage (COV) to be applied to the differential mobility spectrometry device so as to transmit a first plurality of ions; cause a second combination of SV and COV to be applied to the differential mobility spectrometry device so as to transmit a second plurality of ions, wherein at least one of the SV and COV in the second combination differs from the SV and COV in the second combination; and cause a DC voltage to be applied to the auxiliary electrodes while transmitting the first and second plurality of ions through the ion guide so as to generate an axial electric field along a longitudinal axis of the ion guide.

In certain aspects, a duration between terminating transmission of the first plurality of ions and initiating transmission of the second plurality of ions is less than about 30 ms. For example, the duration between terminating transmission of the first plurality of ions and initiating transmission of the second plurality of ions can be less than about 10 ms.

In various aspects, the ion guide may be disposed in a vacuum chamber having a pressure in the mTorr range.

In certain aspects, the control system may be further configured to cause the differential mobility spectrometry device operating in a transmission mode in which ion mobility filtering is disabled, and adjust the DC voltage applied to the auxiliary electrodes when operating in transmission mode to remove the axial electric field generated by the auxiliary electrodes. For example, in some related aspects, the control system may be configured to adjust the DC voltage applied to the auxiliary electrodes to be substantially the same as a DC offset of the multipole rods of the ion guide when operating in transmission mode.

In various aspects, the mass spectrometry system may further comprise a lens disposed adjacent the outlet end of the ion guide, wherein the control system is configured to adjust a potential on a lens such that the lens is more attractive to the ions relative to an offset of the quadrupole rod set of the ion guide. Additionally, in some related aspects, the multipole rod set may comprise a quadrupole rod set.

In some aspects, the quadrupole rod set can comprise a first pair of rods and a second pair of rods and wherein the rods of the quadrupole rod set are spaced apart from the longitudinal axis such that the rods of each pair are disposed on opposed sides of the longitudinal axis. Additionally, the plurality of auxiliary electrodes may comprise at least one pair of auxiliary electrodes extending along the longitudinal axis on opposed sides thereof, wherein each of the auxiliary electrodes may be interposed between a single rod of the first pair of rods and a single rod of the second pair of rods.

The auxiliary electrodes can have a variety of configuration. For example, in some aspects, a distance between an innermost surface of the auxiliary electrodes and the longitudinal axis of the ion guide decreases along the length of the ion guide. Additionally or alternatively, the auxiliary electrodes may have a T-shaped cross-sectional shape.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein mean 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Systems and methods in accordance with various aspects of the present teachings may be effective to improve the performance of a differential mobility spectrometry device and a MS device operating in tandem relative to conventional systems for DMS-MS. For example, whereas a substantial pause is conventionally required between each of consecutive COVs applied to DMS electrodes across a desired COV range (e.g., a pause of ~20-30 ms), methods and systems in accordance with the present teachings utilize an ion guide for receiving transmitted ions from the differential mobility spectrometry device that may significantly reduce a pause duration between the application of different COV values without substantially increasing the likelihood of contamination or cross-talk between groups of ions transmitted by the differential mobility spectrometry device at each COV value.

Figure 1:
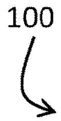
FIG. 1 is a schematic representation of an exemplary differential mobility spectrometer-tandem mass spectrometer system in accordance with an aspect of various embodiments of the applicant's teachings.
Figure 1:
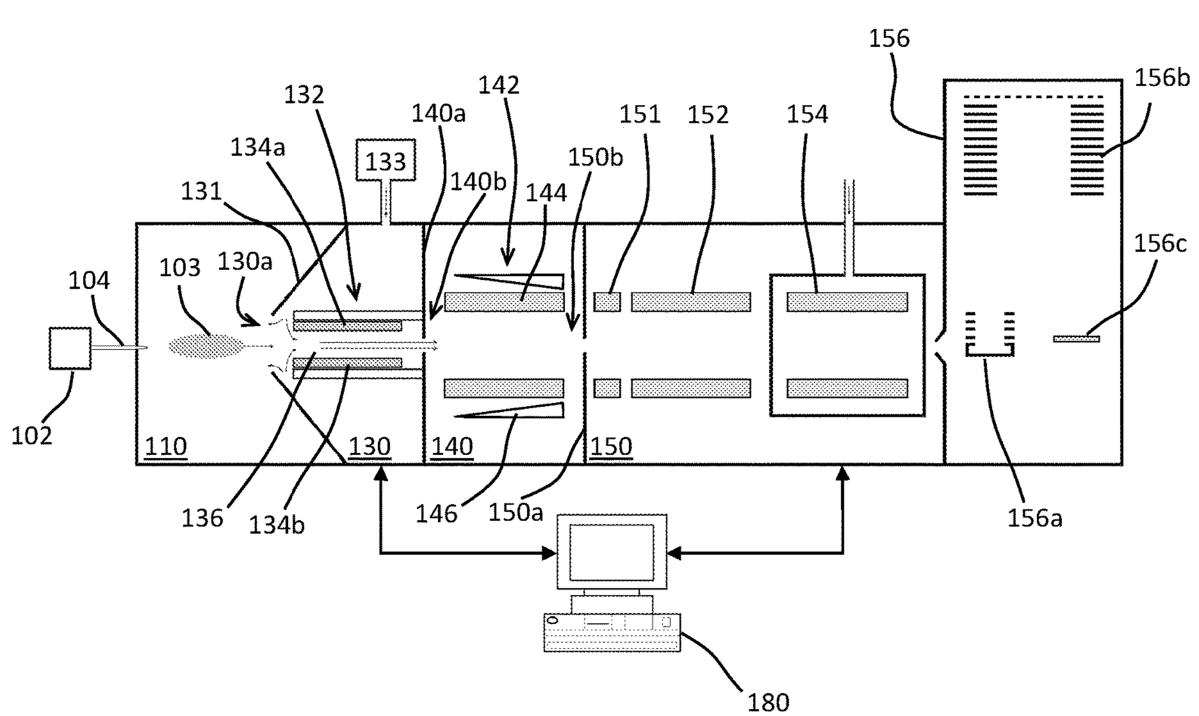

FIG. 1 schematically depicts an embodiment of an exemplary system 100 for performing differential mobility spectrometry-tandem mass spectrometry (differential mobility spectrometry-MS/MS) in accordance with various aspects of the applicant's teachings. It should be understood that mass spectrometry system 100 represents only one possible configuration and that other mass spectrometry systems modified in accordance with the present teachings can also be used as well. As shown, the system 100 generally comprises a differential mobility spectrometry device 132 configured to receive ions 103 from an ion source 104 and transmit at least a portion of the ions received thereby to one or more downstream vacuum chambers (e.g., vacuum chamber 140, vacuum chamber 150) for processing (e.g., mass analyzing) in accordance with the present teachings. As shown in FIG. 1, the downstream vacuum chamber 140 houses an ion guide 142 through which ions received from the differential mobility spectrometry device 132 are transported prior to entering a second vacuum chamber 150 that may house a mass filter 152, a fragmentation device 154 (which may be a collision cell in some embodiments), and a time-of-flight (ToF) mass analyzer 156. One or more power supplies (e.g., under the control of computer system 180) may be configured to apply various DC, AC, and/or RF signals to the various components of the system 100 for controlling the movement and processing of ions 103 within the system 100, as otherwise discussed herein. Though the exemplary second vacuum chamber 150 is depicted as housing two quadrupoles (i.e., elongated rod sets mass filter 152 (also referred to as Q1), fragmentation device 154 (also referred to as q2), and a ToF mass analyzer 156, it will be appreciated that more or fewer mass analyzers or ion processing elements can be included in systems in accordance with the present teachings. Further, though mass filter 152 and fragmentation device 154 are generally referred to herein as quadrupoles (that is, they have four rods) for convenience, the elongated rod sets of the mass filter 152 and the fragmentation device 154 may be other suitable multipole configurations. For example, fragmentation device 154 can comprise a hexapole, octapole, etc. It will also be appreciated that the mass spectrometry system 100 can comprise any of triple quadrupoles, linear ion traps, quadrupole time of flight, Orbitrap or other Fourier transform mass spectrometry systems, all by way of non-limiting examples.

In the exemplary embodiment depicted in FIG. 1, the differential mobility spectrometry device 132 is contained within a curtain chamber 130, which is defined by a curtain plate or boundary member 131 that contains an opening 130*a* in communication with an ionization chamber 110. A curtain gas supply 133 is fluidly connected to the curtain chamber 130 to supply curtain gas thereto. As shown, the exemplary differential mobility spectrometry device 132 comprises a pair of opposed electrode plates 134*a,b* that surround a transport gas that drifts from an inlet of the differential mobility spectrometry device 132 adjacent the opening 130*a* to an outlet of the differential mobility spectrometry device 132 adjacent inlet 140*b* of the vacuum chamber 140 containing the ion guide 142.

As indicated by the arrows of FIG. 1, the pressure of the curtain gases in the curtain chamber 130 can provide both a curtain gas outflow out of the opening 130*a,* as well as a curtain gas inflow into the inlet of the differential mobility spectrometry device 132, which inflow becomes the drift gas that carries the ions 103 through the analytical gap 136 toward the inlet 140*b* of the vacuum chamber 140 (e.g., an orifice in plate 140*a*). In some aspects, a voltage can be applied to the curtain plate 131 from a suitable source to propel the ions 103 across the gap between the curtain plate 131 and the inlet end of the electrodes 134*a,b*. Upon entering the analytical gap 136, the ions 103 are swept along in the drift gas, and while being subjected to varying electric field generated by the parallel electrodes 134*a,b* to cause separation of ions based on ion mobility properties. Selected ions 103 (e.g., ions not neutralized on the electrodes 134*a,b*) and drift gas continue to travel down the analytical gap 132 toward inlet 140*b* of the vacuum chamber 140, within which the transmitted ions may be subjected to further processing.

By way of example, in certain aspects, a separation voltage (SV) and a compensation voltage (COV) can be applied to the differential mobility spectrometry device 132, when enabled, so as to perform differential mobility separation on the ions within the drift gas flowing through the analytical gap 136 between the parallel plate electrodes 134*a,b*. The SV, for example, may be an RF voltage signal applied to the electrodes 134*a,b* so as to generate an electric force across the analytical gap 136 (e.g., perpendicular to the central axis of the analytical gap 136) such that ions of various species migrate radially away from the axis of the transport chamber by a respective characteristic amount during each cycle of the RF waveform due to differences in their respective mobilities during the high field and low field portions of the RF signal. On the other hand, the COV, which may be a DC potential applied across the analytical gap 136, can provide a counterbalancing electrostatic force to that of the SV. In this manner, the COV can be tuned so as to preferentially restore a stable trajectory to particular ions such that they will traverse the entire length of the analytical gap 136 and be transmitted through inlet 140*b*.

The SV-COV combination may be adjusted in a variety of manners such that one or more species of ions may be transmitted from the differential mobility spectrometry device 132 into the inlet 140*b* as their drift therethrough does not cause them to be neutralized at the electrodes 134*a,b*. By way of example, in various aspects, the SV can be fixed at a value while the COV is adjusted (e.g., scanned) to serially pass ions exhibiting a particular differential mobility so as to generate a mobility spectrum. Alternatively, in some example aspects, a mobility spectrum may be generated by setting the COV to a fixed value while the SV is scanned so as to serially pass ions of interest. In some aspects, the differential mobility spectrometry device 132 may be operated with both the COV and SV fixed such that only ion species with a particular differential mobility are transmitted through from the differential mobility spectrometry device 132 while the remaining species of ions drift toward the electrodes 134*a,b* and are neutralized. Examples of differential mobility spectrometers which may be modified for use in accordance with the present teachings are described, for example, in U.S. Pat. Nos. 8,084,736 and 9,835,588, the teachings of which are hereby incorporated by reference in their entireties.

In various aspects, the computer system 180 may cause the differential mobility spectrometry device 132 to alternatively operate in a mode in which the differential mobility spectrometry device 132 is configured to not filter and/or not separate ions based on their differential mobilities (e.g., substantially all ions received from the ion source 104 are configured to be transmitted therethrough without being neutralized on the plates 134*a,b*). Such a "transmission mode" or "disabled mode" may be effectuated, for example, by the computer system 180 causing no SV or no differential DC voltages to be applied the plates 134*a,b* of the differential mobility spectrometry device 132 (e.g., SV=COV=0 V). It will be appreciated, for example, that when operating the differential mobility spectrometry device 132 in such a transmission mode, DC voltages applied to the electrode plates 134*a,b* may alternatively represent a symmetric non-zero offset value of the same polarity to the ions of interest so as to generate a substantially radially-inward force (e.g., toward the central axis) on the ions as they are transmitted between the electrode plates 134*a,b*. It will also be appreciated that the differential mobility spectrometry device can also be considered to essentially operate in transmission mode when low values of SV (e.g., less than a few hundreds of volts) and COV (e.g., less than 1V) results in no substantial separation for many of the ions received from the ion source 104.

As will be appreciated by a person skilled in the art, the differential mobility spectrometry device 132 depicted in FIG. 1 is just one example of a device suitable for filtering ions based on their ion mobility characteristics, and that other differential mobility spectrometry device configurations are suitable for use in accordance with the present teachings. By way of example, though the device 132 of FIG. 1 defines a straight ion path extending between parallel plates 134*a,b*, suitable differential mobility spectrometry devices may alternatively provide a curved ion path between an outer electrode and an inner electrode, the space between defining the analytical gap. In such cases, an asymmetric dispersion voltage or separation voltage is applied to the inner electrode, with the curved ion path providing a focusing effect in the presence of the asymmetric waveform that guides ions around the inner electrode within the analytical gap. When the curved differential mobility spectrometry device is enabled, for example, a compensation voltage can be applied to the outer electrode to select for specific ions having specific asymmetric differential ion mobility properties. However, when the curved differential mobility spectrometry device is operating in transmission mode, both the asymmetric dispersion voltage and compensation voltage may be set to 0V.

In accordance with certain aspects of the present teachings, the curtain gas can be set to flow rates determined by a flow controller and valves so as to alter the drift time of ions within the differential mobility spectrometry device 132. Additionally, in some aspects, a throttle gas supply (not shown) can provide a throttle gas to the outlet end of the differential mobility spectrometry device 132 so as to modify the flow rate of the drift gas through the differential mobility spectrometry device 132 as described, for example, in U.S. Pat. Nos. 8,084,736,8,513,600, and 9,171,711, all of which are incorporated herein by reference. Each of the curtain gas supply 133 and throttle gas supply (not shown) can provide the same or different pure or mixed composition gas to the curtain gas chamber. By way of non-limiting example, the curtain gas can be air, $O_2$, He, $N_2$, or $CO_2$. The pressure of the curtain chamber 130 can be maintained, for example, at or near atmospheric pressure (i.e., 760 Torr).

Additionally, in some aspects, the system 100 can include a chemical modifier supply (not shown) for supplying a chemical modifier and/or reagent (hereinafter referred as chemical modifier) to the curtain and throttle gases. As will be appreciated by a person skilled in the art, the modifier supply can be a reservoir of a solid, liquid, or gas through which the curtain gas is delivered to the curtain chamber 130. By way of example, the curtain gas can be bubbled through a liquid modifier supply. Alternatively, a modifier liquid or gas can be metered into the curtain gas, for example, through an LC pump, syringe pump, or other dispensing device for dispensing the modifier into the curtain gas at a known rate. For example, the modifier can be introduced using a pump so as to provide a selected concentration of the modifier in the curtain gas. The modifier supply can provide any modifier known in the art including, by way of non-limiting example, water, volatile liquid (e.g., methanol, propanol, acetonitrile, ethanol, acetone, and benzene), including alcohols, alkanes, alkenes, halogenated alkanes and alkenes, furans, esters, ethers, aromatic compounds. As will be appreciated by a person skilled in the art in light of the present teachings, the chemical modifier can interact with the ions 103 such that the ions differentially interact with the modifier (e.g., cluster via hydrogen or ionic bonding) during the high and low field portions of the SV, thereby effecting the COV needed to counterbalance a given SV. In some cases, this can increase the separation between the ion species.

The ions 103 emitted into the curtain chamber 130 via curtain chamber inlet 130*a* can be generated by any known or hereafter developed ion source for generating ions and modified in accordance with the present teachings. Non-limiting examples of ion sources suitable for use with the present teachings include atmospheric pressure chemical ionization (APCI) sources, electrospray ionization (ESI) sources, continuous ion source, a pulsed ion source, an inductively coupled plasma (ICP) ion source, a matrix-assisted laser desorption/ionization (MALDI) ion source, a glow discharge ion source, an electron impact ion source, a chemical ionization source, or a photo-ionization ion source, among others. In the example depicted in FIG. 1, the ion source 104 comprises an electrospray electrode, which can comprise a capillary fluidly coupled to a sample source 102 (e.g., through one or more conduits, channels, tubing, pipes, capillary tubes, etc.), and which terminates in an outlet end that at least partially extends into the ionization chamber 110 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 110 to form a sample plume comprising a plurality of micro-droplets generally directed toward (e.g., in the vicinity of) the curtain plate opening 130*a*. As is known in the art, analytes contained within the micro-droplets can be ionized (i.e., charged) by the ion source 104, for example, as the sample plume is generated. By way of non-limiting example, the outlet end of the electrospray electrode can be made of a conductive material and electrically coupled to a pole of a voltage source (not shown), while the other pole of the voltage source can be grounded. Micro-droplets contained within the sample plume can thus be charged by the voltage applied to the outlet end such that as the desorption solvent within the droplets evaporates during desolvation in the ionization chamber 110 such bare charged analyte ions are released and drawn toward the curtain plate opening 130*a*. One or more power supplies can supply power to the ion source 104 with appropriate voltages for ionizing the analytes in either positive ion mode (analytes in the sample are protonated, generally forming cations to be analyzed) or negative ion mode (analytes in the sample are deprotonated, generally forming anions to be analyzed). Further, the ion source 104 can be nebulizer-assisted or non-nebulizer assisted. In some embodiments, ionization can also be promoted with the use of a heater (not shown), for example, to heat the ionization chamber so as to promote dissolution of the liquid discharged from the ion source.

Additionally, as shown in FIG. 1, the system 100 can include a sample source 102 configured to provide a sample to the ion source 104. The sample source 102 can be any suitable sample inlet system known in the art. By way of example, the ion source 102 can be configured to receive a fluid sample from a variety of sample sources, including a reservoir containing a fluid sample that is delivered to the sample source (e.g., pumped) or via an injection of a sample into a carrier liquid. In various example aspects, the sample source 102 may be a sample separation device utilizing techniques such as, but not limited to, liquid chromatography (LC), gas chromatography, or capillary electrophoresis. In some example aspects, the sample separation device may comprise an in-line liquid chromatography (LC) column, for example, that is configured to separate one or more compounds from a sample over time. In such aspects, the sample to be analyzed may be the eluent of the LC column, whose composition (and the analytes contained therein) may change over time, for example, based on binding affinity and/or the elution gradient applied to the LC column.

As shown in FIG. 1, ions exiting the differential mobility spectrometry device 132, whether operating in "enabled mode" (e.g., only certain ions exhibiting a particular ion mobility are transmitted through the differential mobility spectrometry device 132) or in "transmission mode" (e.g., substantially all ions received from the ion source 104 are transmitted therethrough) may enter the vacuum chamber 140 via inlet 140*b* containing the ion guide 142. It will be appreciated, however, that one or more intermediate vacuum chambers (not shown) may be disposed between the outlet of the differential mobility spectrometry device 132 and the vacuum chamber 140. Such intermediate vacuum chambers may be maintained at elevated pressures greater than the vacuum chamber 140 within which the ion guide 142 is disposed, and may contain one or more RF ion guides (e.g., quadrupoles, QJet) and/or ion optical elements that utilize a combination of gas dynamics and radio frequency fields to enable the efficient transport of ions transfer ions downstream to the increasingly lower pressure vacuum chambers. Each of these RF ion guides can be configured to focus ions while enabling transport through one or more differential vacuum regions. By way of non-limiting example, the ionization chamber 110 and curtain chamber 130 may be maintained at atmospheric or substantially atmospheric pressure (e.g., about 760 Torr), while the vacuum chamber 140 within which the ion guide 142 is housed, can be associated with a pump (not shown, e.g., a turbomolecular pump) operable to evacuate the chamber to a pressure suitable to provide collisional cooling within the ion guide 142. For example, the vacuum chamber 140 can be evacuated to a pressure approximately in the range of about 1 mTorr to about 30 mTorr, though other pressures can be used for this or for other purposes. For example, in some aspects, the vacuum chamber 140 can be maintained at a pressure such that pressure x length of quadrupole rods of the ion guide 142 is greater than 2.25×10-2 Torr-cm. In some example aspects, the ion guide 142 comprising auxiliary electrodes 146 are contained within a vacuum chamber 140 maintained at a pressure in a range of about 5 to about 15 mTorr.

In accordance with various aspects of the present teachings, the ion guide 142 may generally include a quadrupole rod set 144 comprising four rods surrounding and parallel to the longitudinal axis along which the ions are transmitted. As is known in the art, the application of various RF and/or DC potentials to the quadrupole rod set 144 of the ion guide 142 may provide collisional cooling of the ions (e.g., in conjunction with the pressure of vacuum chamber 140) and/or help form an ion beam prior to delivering ions into the vacuum chamber 150 through the exit aperture 150*b* in lens 150*a* (e.g., an orifice plate, IQ1), which is disposed between the vacuum chamber 140 of ion guide 142 and the adjacent vacuum chamber 150.

As shown in FIG. 1, the ion guide 142 additionally includes a plurality of auxiliary electrodes 146 to which electric potentials can be applied in order to generate an axial electric field along the longitudinal axis of the ion guide. In accordance with various aspects of the present teachings, the ion guide 142 may be operated in a variety of modes depending, for example, on the configuration of the upstream differential mobility spectrometry device 132. By way of example, when the differential mobility spectrometry device 132 is operated such that substantially all ions received from the ion source 104 are transmitted through the inlet 140*b* (i.e., ion mobility filtering is disabled), the controller 180 may cause the ion guide 142 to operate in a first mode in which the ion guide 142 provides collisional cooling and/or radial focusing without providing an axial electric field as discussed otherwise herein. However, when the differential mobility spectrometry device 132 is operating in "enabled mode" such that certain ions are filtered thereby based on their differential mobilities, electric potentials applied to the auxiliary electrodes 146 may be adjusted such that an axial electric field is generated within the ion guide 142 so as to reduce the transit time of the ions therethrough. Without being bound by any particular theory, it is believed that the filtering of ions by the differential mobility spectrometry device 132 may, in some instances, sufficiently reduce ion flux through the downstream elements (e.g., by filtering the ions 103 received from the ion source 104 based on their differential mobility) to effect space charge conditions within ion guide 142, which when present may be effective to help accelerate ions through ion guide 142 toward the downstream vacuum chamber. However, absent space charge conditions (e.g., when the differential mobility spectrometry device 132 is in "enabled mode"), ion transit through ion guide 142 may be slowed. While the use of a substantial delay as in conventional devices may provide additional time to ensure optimum ion transmission from the ion guide, such conventional methods significantly increase the duty cycle for each SV-COV combination applied by the differential mobility spectrometry device 132. In accordance with various aspects of the present teachings, the provision of an additional axial electric field by the auxiliary electrodes when the differential mobility spectrometry device 132 is operating in enabled mode reduces the ion transit time through the ion guide 142 such that a pause between the application of different SV-COV combinations can be reduced relative to conventional systems without substantially increasing the likelihood of contamination or cross-talk between groups of ions transmitted by the differential mobility spectrometry device 132. In some aspects, the electric field created by the auxiliary electrodes may be preferably applied only when the differential mobility spectrometry device is operating in enabled mode due to ion transmission control within the ion guide 142 (e.g., when being operated as a conventional quadrupole ion guide) behaving in a less than ideal manner (e.g., non-linear).

Figures 2A, 2B:
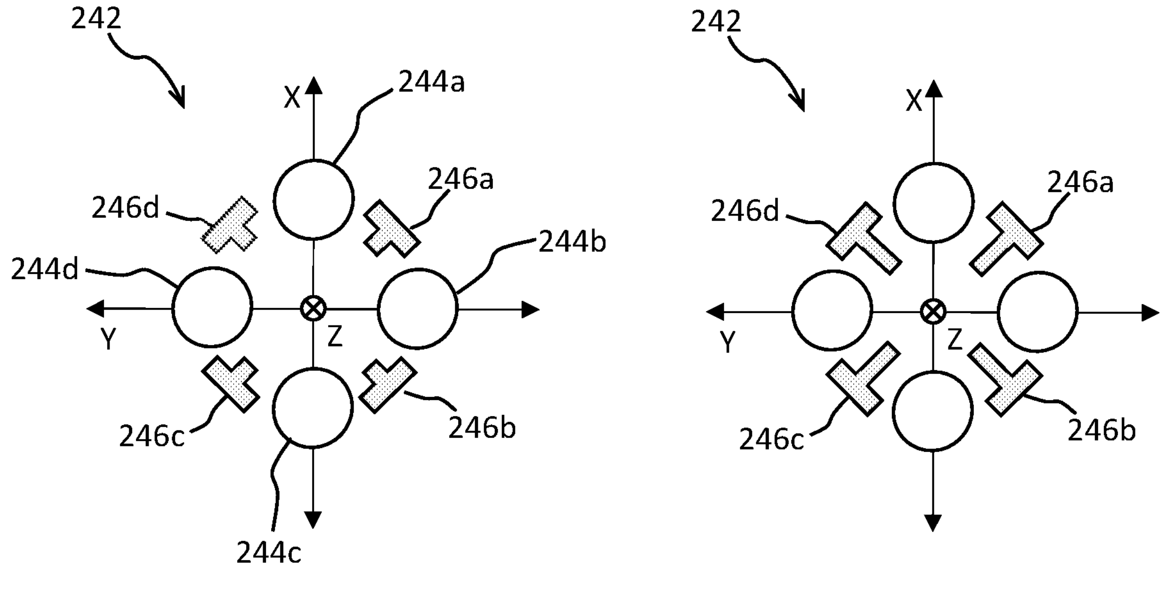
FIGS. 2A-B are schematic representations of an ion guide for use in the system of FIG. 1 in accordance with an aspect of various embodiments of the applicant's teachings.

The auxiliary electrodes 146 may be effective to generate an axial electric field within ion guide 142 in a variety of manners. With reference now to FIGS. 2A-B, an example ion guide 242 comprising a quadrupole rod set 244 and a plurality of auxiliary electrodes 246 in accordance with various aspects of the present teachings is depicted. As shown, the quadrupole rod set 244 consists of four parallel rod electrodes 244*a-d* that are disposed around and parallel to a central longitudinal axis (Z) extending from an input end (e.g., toward ion source 102 in FIG. 1) to an outlet end (e.g., toward vacuum chamber 150). As best shown in cross-section, the rods 244*a-d* have a cylindrical shape (i.e., a circular cross-section) with the innermost surface of each rod 244*a-d* disposed equidistant from the central axis (Z) and with each of the rods 244*a-d* being equivalent in size and shape to one another. The rods 244*a-d* are generally grouped into two pairs of rods (e.g., a first pair comprising rods 244*a,c* disposed on the X-axis and a second pair comprising rods 244*b,d* disposed on the Y-axis), with rods of each pair being disposed on opposed sides of the central axis (Z) and to which identical electrical signals can be applied. The minimum distance between each of the rods 244*a-d* and the central axis (Z) is defined by a distance $r_0$ such that the innermost surface of each rod 244*a-d* is separated from the innermost surface of the other rod in its rod pair across the central longitudinal axis (Z) by a minimum distance of $2r_0$. It will be appreciated that though the rods 244*a-d* are depicted as cylindrical, the cross-sectional shape, size, and/or relative spacing of the rods 244*a-d* may be varied as is known in the art. For example, in some aspects, the rods 244*a-d* can exhibit a radially internal hyperbolic surface according to the equation $x^2-y^2=r_0^2$, where $r_0$ (the field radius) is the radius of an inscribed circle between the electrodes in order to generate quadrupole fields.

The rods 244$_{a-d}$ are electrically conductive (i.e., they can be made of any conductive material such as a metal or alloy) and can be coupled to one or more power supplies such that one or more electrical signals can be applied to each rod 244*a-d* alone or in combination. As is known in the art, the application of radiofrequency (RF) voltages to the rods 244*a-d* of the quadrupole rod set 244 can be effective to generate a quadrupolar field that radially confines the ions as they pass through the quadrupole rod set 244. For example, the power system can apply an electric potential to the first pair of rods 244*a,c* of a rod offset voltage (RO)−Vcos Ωt, where V is the zero-to-peak amplitude of the RF signal provided by an RF voltage source, Ω is the angular frequency of the RF signal, and t is time. The power system can also apply an electric signal to the second pair of rods 244*b,d* of RO+Vcos Ωt such that the RF electrical signals applied to the first pair of rods 244*a,c* and the second pair of rods 244*b,d* are 180° out of phase with one another. It will be appreciated by a person skilled in the art that the quadrupole rod set 244 can thus be operated in a RF-only transmission mode such that ions entering the quadrupole rod set 244 that are stable at and below Mathieu parameter q=0.908 would be transmitted through the quadrupole rod set 244 without striking the rods 244*a-d*.

As noted above, ion guides in accordance with various aspects of the present teaching (e.g., ion guide 142 of FIG. 1) additionally include a plurality of auxiliary electrodes, which as shown in FIGS. 2A-B may comprise a plurality of linear accelerator (LINAC) electrodes 246*a-d*. Generally, the auxiliary electrodes are electrically conductive (i.e., they can be made of any conductive material such as a metal or alloy) and can be coupled to one or more power supplies such that one or more electrical signals can be applied to each auxiliary electrode 246*a-d* alone or in combination. Though the ion guide 242 depicted in FIG. 2A-B includes four auxiliary electrodes interposed between rods 244*a-d* of the quadrupole rod set 244, more or fewer auxiliary electrodes can be utilized in accordance with the present teachings. For example, in various alternative embodiments, the plurality of auxiliary electrodes may just include a pair of electrodes 246*a,c* disposed on opposed sides of the longitudinal axis for generating an axial electric field in accordance with the present teachings. In some embodiments, these LINAC electrodes 246*a-d* are disposed within a region (e.g., vacuum chamber 140 of FIG. 1) that is maintained at a pressure in a range from about 5 to about 15 mTorr.

As shown in the cross-sections of FIGS. 2A-B, the auxiliary electrodes 246*a-d* extend along the longitudinal axis (Z) between the input end (FIG. 2A) and the output end (FIG. 2B) of the quadrupole rod set 244. As shown, the auxiliary electrodes 246*a-d* comprise four T-shaped electrodes that are each disposed between a single rod of the first pair of rods 244*a,c* and a single rod of the second pair of rods 244*b,d*. Comparing FIG. 2A with 2B, the radial portion of the auxiliary electrodes 246*a-d* tapers along the length of the quadrupole rod set 244 such that the innermost surface of the auxiliary electrodes 246*a-d* adjacent to the input end (FIG. 2A) is separated from the longitudinal axis by a larger distance than the innermost surface of the auxiliary electrodes 246*a-d* adjacent to the output end (FIG. 2B). As discussed below, depending upon the application of a DC voltage to the auxiliary electrodes 246*a-d*, this tapering may establish an electric field component along the axis (Z) that helps axially transport (e.g., accelerate) ions from the input end to the output end of the ion guide 242.

As noted above with respect to FIG. 1, the ion guide 142 is generally configured to transmit ions received from the differential mobility spectrometry device 132 for further processing within downstream high-vacuum chamber 150. For the depicted ion guide 242 of FIG. 2, for example, the provision of RF signals and a DC rod offset (RO) to the quadrupole rod set 244 as well as the relatively high pressures within ion guide 242 may provide collisional cooling and/or be effective to radially focus the ions into an ion beam prior to delivering ions into a lower pressure region (e.g., the vacuum chamber 150 of FIG. 1). While the electric field within the ion guide 242 is generally a radially-confining quadrupolar field, in some aspects, a controller (e.g., controller 180 of FIG. 1) can additionally cause a DC power supply (not shown) to apply an additional DC voltage to the auxiliary electrodes that can be effective to superimpose an electric field having a component in the longitudinal direction of the quadrupole rod set 244 (along the z-direction) to accelerate the ions toward the outlet end of the ion guide 242. For example, in some embodiments in which a DC signal is applied to the auxiliary electrodes 246 that is more attractive to the ions of interest relative to the RO, the amplitude of the superimposed electric field can increase as a function of decreasing radial distance of the auxiliary electrodes 246 from the longitudinal axis, thereby causing the ions to be accelerated toward the outlet end of the ion guide 142. However, in a configuration in which the controller causes a DC signal to be applied to the auxiliary electrodes 246 equal to the RO of quadrupole rod set 244, for example, the auxiliary electrodes 246 would not be effective to generate an axial electric field as the electric potential at each point along the longitudinal axis of the ion guide 242 is substantially constant (RO).

Figures 3A, 3B:
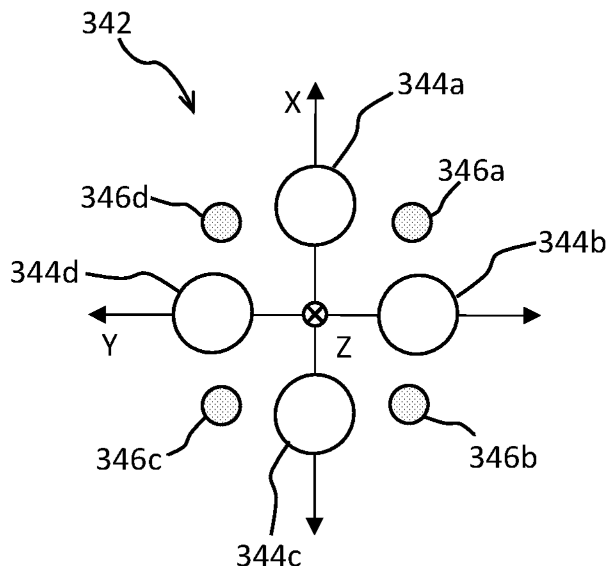
FIGS. 3A-B are schematic representations of another ion guide for use in the system of FIG. 1 in accordance with an aspect of various embodiments of the applicant's teachings.

It will be appreciated that though the example auxiliary electrodes 246*a-d* are depicted in FIGS. 2A-B as having a T-shaped cross-section, the cross-sectional shape, size, and/or relative spacing of the auxiliary electrodes may be varied to provide an axial electric field within a multipole ion guide in accordance with various aspects the present teachings. For example, with reference now to FIGS. 3A-B, another example ion guide 342 in accordance with the present teachings is depicted. The ion guide 342 is similar to ion guide 242, but differs in that the auxiliary electrodes 346*a-d* instead comprise four rods having a circular cross-sectional shape. Comparing FIG. 3A with 3B, it will be appreciated that the rods 346*a-d* are tilted (e.g., non-parallel relative to the central axis) such that the innermost surface of the electrodes 346*a-d* are closer to the axis (Z) at the output end of the ion guide 342.

Figure 4A:
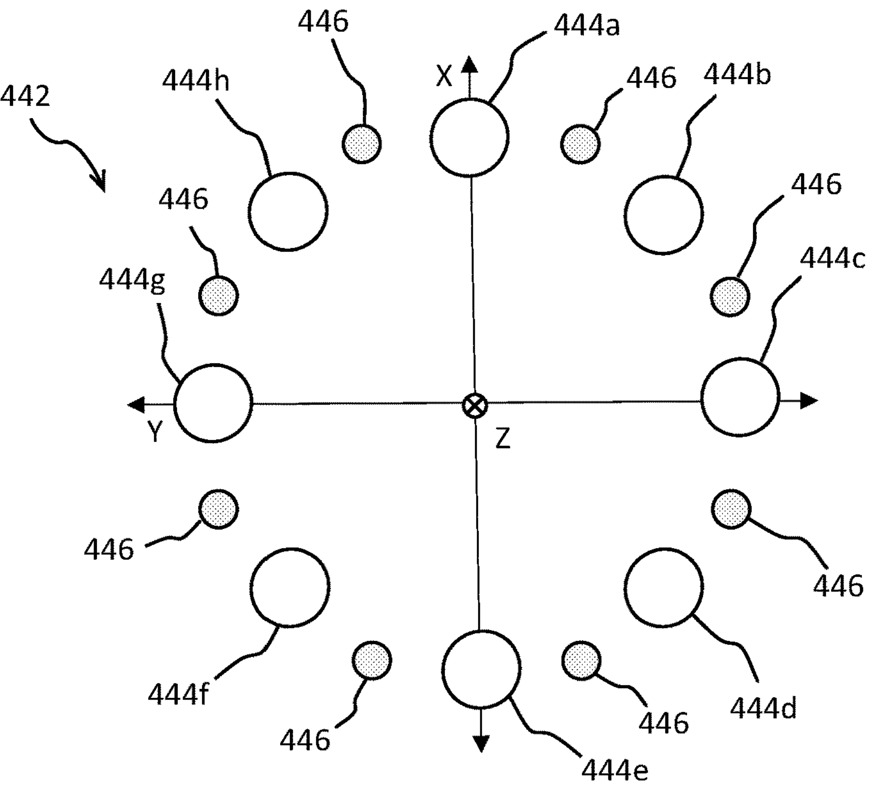
FIGS. 4A-B are schematic representations of another ion guide for use in the system of FIG. 1 in accordance with an aspect of various embodiments of the applicant's teachings.
Figure 4B:
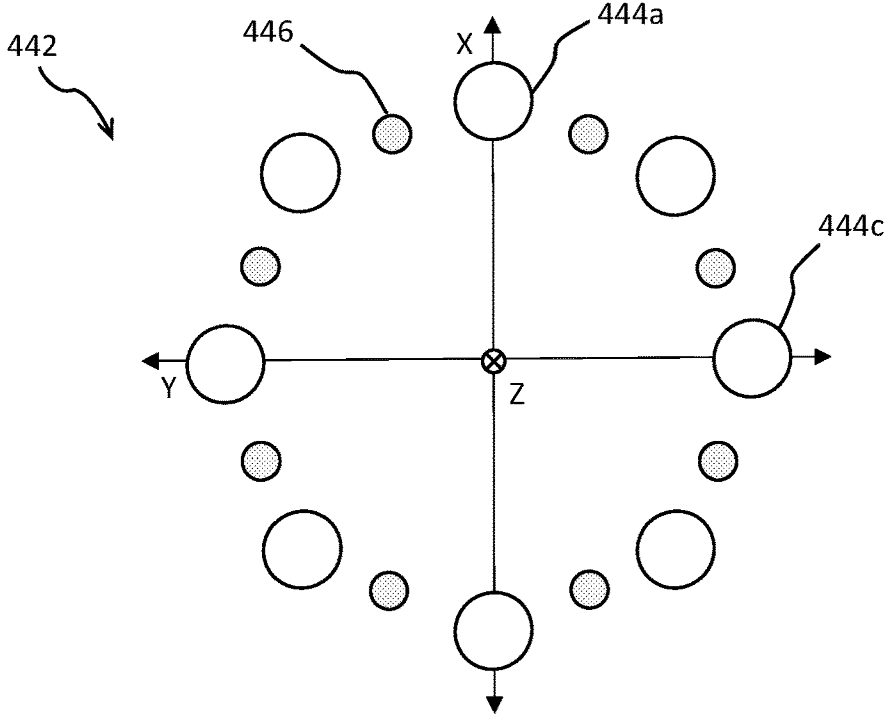

Though multipole ion guide 242 (FIGS. 2A-B) and multipole ion guide 342 (FIGS. 3A-B) are depicted as each comprising four rods (i.e., 244*a-d*, 344*a-d*), the present teachings are not so limited to quadrupole rod sets. Rather, multipole ion guides in accordance with the present teachings can comprise other suitable multipole configurations for providing collisional cooling of the ions and/or helping form an ion beam prior to delivering ions into a downstream vacuum chamber such as hexapole, octapole, decapole, dodecapole, and other higher-order multipoles. With reference now to FIGS. 4A-B, another example of an ion guide 442 in accordance with the present teachings is depicted. The ion guide 442 differs from that of FIGS. 2A-B and 3A-B in that the ion guide 442 comprises a higher order multipole, in this example, an octapole containing eight rods 444*a-h* forming an octapole rod set 444 for radially confining ions as they pass through the ion guide 442. In such a higher-order multipole, RF voltages with 180-degree phase difference may be applied to the various rods of the multipole rod set. The rod set that is applied with the RF voltage with the 0-degree phase is often referred to as the first pole electrode set, and the rod electrode set that is applied with the RF voltage with about 180-degree phase relative to the first RF voltage is often referred to as the second pole electrode set. For example, rods 444*a,c,e,g* may be understood to be the first pole electrode set and rods 444*b,d,f,h* may be the second pole electrode set.

As shown in FIGS. 4A-B, interspersed between each of the rods 444*a-h* forming the octapole rod set 444, are eight auxiliary electrodes 446. As with the auxiliary electrodes 346 of FIGS. 3A-B, the auxiliary electrodes 446 of FIGS. 4A-B are in the form of rods having a circular cross-sectional shape. Further, the auxiliary electrodes 446 are tilted (e.g., non-parallel relative to the central axis) such that the innermost surface of the rods 446 at the input end of the ion guide 442 (FIG. 4A) are spaced further from the axis (Z) than the innermost surface of the rods 446 at the output end of the ion guide 442 (FIG. 4B) so as to generate an axial field within the ion guide 442 when an attractive DC potential is applied to the auxiliary electrodes 446 as otherwise discussed herein. It will be appreciated that though the depicted auxiliary electrodes 446 are in the form of cylindrical rods, a variety of configurations of auxiliary electrodes may be used to generate the axial electric field in accordance with the present teachings. By way of non-limiting example, the cylindrical auxiliary electrodes 446 could instead auxiliary electrodes having a T-shaped cross-sectional shape as in FIGS. 2A-B, wherein the radial portions of the T-shaped electrodes tape along the length of the octapole rod set 444.

With reference again to FIG. 1, ions that are transmitted from the ion guide 142 enter the vacuum chamber 150 via inlet 150*b* of the exit lens 150*a* (IQ1) disposed in proximity of the output end of the ion guide 142. In some embodiments, a DC voltage may be applied to the exit lens 150*a* to cause the generation of an electric field that facilitates the exit of the ions from the ion guide 142. For example, a DC voltage source (not shown), operating under the control of the controller 180, can apply DC voltages to the exit lens 150*a* (e.g., in range of about 1 to 50 V attractive relative to the DC offset applied to the quadrupole rod set 144). Similarly, the exit lens 150*a* may be coupled to a RF power supply such that an RF signal may be applied thereto. For example, a RF voltage source, operating under the control of controller 180, can apply an RF signal to exit lens 150*a*. It will be appreciated that the lens 150*a* can be implemented in a variety of different ways. For example, in some embodiments, the lenses can be in the form of a plate having an opening through which the ions pass. In other embodiments, at least one (or both) of the lenses can be implemented as a mesh. As shown, there can also be set of stubby rods 151 disposed between the exit lens 150*a* and at the input end of the mass filter 152.

Ions transmitted into the vacuum chamber 150 via inlet 150*b* enter the mass filter 152 (also referred to herein as Q1). As will be appreciated by a person of skill in the art, the mass filter 152 can be operated as a conventional transmission RF/DC quadrupole mass filter that can be operated to select an ion of interest and/or a range of ions of interest. For example, the computer system 180 can cause suitable RF/DC voltages to be applied to the mass filter 152 so as to operate in a mass-resolving mode. As should be appreciated, taking the physical and electrical properties of mass filter 152 into account, parameters for an applied RF and DC voltage can be selected so that mass filter 152 establishes a transmission window of chosen m/z ratios, such that these ions can traverse Q1 largely unperturbed. Ions having m/z ratios falling outside the window, however, do not attain stable trajectories within the quadrupole and can be prevented from traversing the mass filter 152. It should be appreciated that this mode of operation is but one possible mode of operation for mass filter 152. By way of example, one or more ion optical elements (not shown) between the mass filter 152 and the fragmentation device 154 can be maintained at a much higher offset potential than mass filter 152 such that Q1 can be operated as an ion trap. In such a manner, the potential applied to the ion optical elements (not shown) can be selectively lowered (e.g., mass selectively scanned) such that ions trapped in mass filter 152 can be accelerated into fragmentation device 154, which could also be operated as an ion trap, for example.

Ions transmitted by the mass filter 152 enter into the adjacent fragmentation device 154, which can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions within the ion beam. By way of example, when in MS/MS mode, the mass filter 152 can be operated to transmit to fragmentation device 154 precursor ions exhibiting a selected range of m/z for fragmentation into product ions within fragmentation device 154. In MS mode, however, a person skilled in the art will appreciate that the parameters for RF and DC voltages applied to rods of the fragmentation device 154 can be selected so that the fragmentation device 154 transmits these ions therethrough largely unperturbed.

Ions that are transmitted by fragmentation device 154 can pass into the adjacent time-of-flight mass analyzer 156, which can again be operated at a decreased operating pressure relative to that of fragmentation device 154, for example, less than about $1\times10^{-4}$ Torr (e.g., about $5\times10^{-5}$ Torr), though other pressures can be used for this or for other purposes. As is known in the art, time-of-flight mass analyzer 156 can be operated so as to generate ion detection signals indicative of the m/z of the precursor and/or product ions received from fragmentation device 154 based on the time required for an ion to traverse a known distance. It will be appreciated that although the time-of-flight mass analyzer 156 is depicted as an time-of-flight device in which ions received from the fragmentation device 154 are orthogonally accelerated by a pusher plate 156*a* toward an ion mirror 156*b*, which reverses the ions' trajectory toward the detector 156*c*, any known or hereafter developed time-of-flight mass analyzer may be configured for use in systems according to the present teachings. Indeed, the mass analyzer 156 may be any of time-of-flight device, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer, all by way of non-limiting example. In some aspects, for example, a quadrupole mass analyzer can be operated as an ion trap for trapping ions received from the fragmentation device 154, with the potentials applied to exit ion optical elements being selectively lowered such that trapped ions can be transmitted in a mass-selective manner to a detector for generating ion detection signals in response to the incident ions. In any event, the computer system 180, which may be in communication with the time-of-flight mass analyzer 156 as shown in FIG. 1, may receive and process the ion detection signals to generate a mass spectrum of ions, for example, indicating the amount of ions (e.g., intensity, count) of each m/z.

Figure 5A:
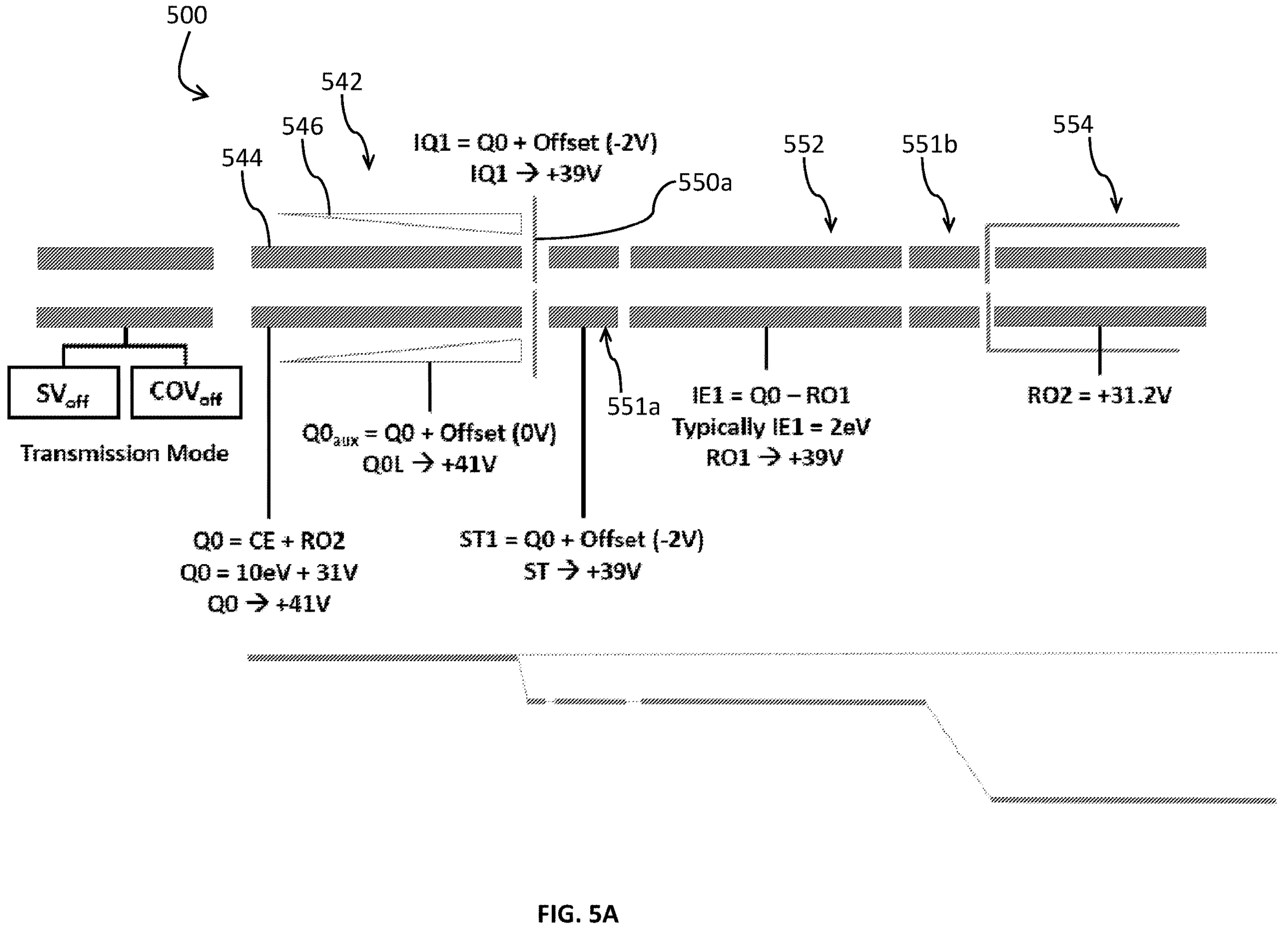
FIGS. 5A-B, in a schematic diagram, illustrates a portion of a mass spectrometer system and corresponding potentials along the central axis at various steps of a method in accordance with one aspect of various embodiments of the applicants' teachings.
Figure 5B:
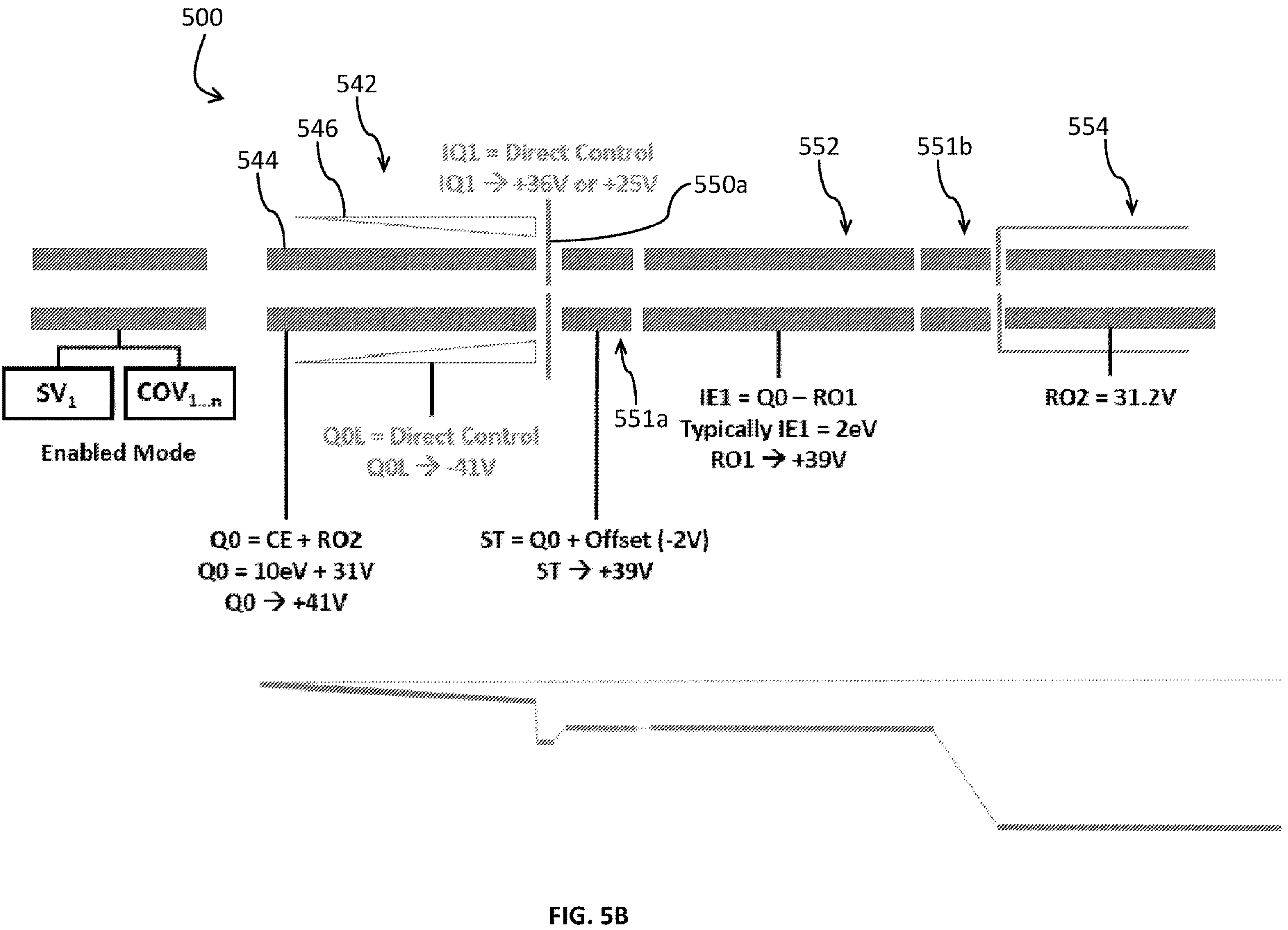

With reference now to FIGS. 5A-B, a portion of an exemplary mass spectrometer system 500 and corresponding potentials along the central axis at various operation configurations in accordance with certain aspects of the present teachings is depicted. Like system 100 of FIG. 1, the system 500 of FIGS. 5A-B generally comprises a differential mobility spectrometry device 532, an ion guide 542 (Q0) having a quadrupole rod set 544 and auxiliary electrodes 546, an exit lens 550*a* (IQ1), a mass filter 552 (Q1), and a collision cell 554 (q2). A detector and/or ToF mass analyzer may be included downstream of the collision cell 554, but is not shown in FIGS. 5A-B for clarity. Additionally, as shown, the example system 500 includes a first set of stubby rods 551*a* (ST1) disposed between the lens 550*a* and the mass filter 552 (Q1) and a second set of RF-only stubby rods 551*b* (ST2) between the mass filter 552 (Q1) and collision cell 554 (q2). As discussed otherwise herein, a controller (e.g., controller 180 of FIG. 1) may be configured to cause RF and/or DC potentials to be applied to the various elements of system 500, for example, for controlling the processing of ions in accordance with various aspects of the present teachings.

With particular reference to FIG. 5A, the system 500 is schematically depicted in a first configuration in which the differential mobility spectrometry device 532 is operated in transmission mode. In particular, neither SV nor COV is applied to the electrodes of the differential mobility spectrometry device 432 (i.e., SV=COV=0) such that substantially all ions received from the ion source (not shown) are transmitted therethrough to the ion guide 542. For purposes of this example, the ion source is configured to generate positive ions.

As indicated in FIG. 5A, the quadrupole rods of the collision cell 554 are maintained at a rod offset voltage of +31.2 V (RO2), with quadrupole rod set 544 of ion guide 542 (Q0) being maintained so as to provide 10 eV of collision energy to ions received thereby. As such, the quadrupole rods of rod set 544 (Q0) are maintained at +41V (RO2+10 eV). In some aspects, while the differential mobility spectrometry device is operating in transmission mode as shown in FIG. 5A, the DC voltage applied to the auxiliary electrodes 546 may be identical to that of the offset of the quadrupole rods 544. In such a configuration, the auxiliary electrodes 546 would not be effective to generate an axial electric field as indicated by the constant electric potential along the length of the ion guide 542 on the plot below, which is intended to illustrate by way of non-limiting example relative voltages along the axis of the mass spectrometer system 500.

As shown in FIG. 5A, in this first configuration, the exit lens 550*a* (IQ1) and first stubby rods 551*a* (ST1) may be maintained at a slightly more attractive voltage relative to the rod offset of quadrupole rods 544 (e.g., −2V offset). In the example schematic, the exit lens 550*b* and stubby rods 551*a* may be controlled to exhibit a DC offset of +39V such that the positive ions are transmitted downstream due to their kinetic energy and the decreased potential of exit lens 550*a* and stubby rods 551*a* relative to that of the ion guide 544. With reference to mass filter 552, the quadrupole rods are maintained at an offset as a function of the offset applied to ion guide 542 and IE1, which is the difference in potential between Q0 and RO1. Whereas IE1 is typically about 2 eV, the quadrupole rods of mass filter 552 are also maintained at +39V (RO1) in the example schematic of this configuration.

Optionally, one or more additional ion guides may be present to transport ions from region to region (e.g., from the differential mobility spectrometry device 532 to ion guide 542 (Q0)).

With reference now to FIG. 5B, the system 500 is schematically depicted in a second configuration in which the differential mobility spectrometry device 532 is instead enabled to filter the ions received from the ion source based on their ion mobility characteristics. In particular, the differential mobility spectrometry device 532 may be configured to iteratively apply different SV-COV combinations such that only a subset of ions may be transmitted into the ion guide 542 at each SV-COV combination. Whereas the DC offset of quadrupole rods 544, mass filter 552, and collision cell 554 are maintained at the same voltages as in the first configuration of FIG. 5A, various aspects of the present teachings provide that the DC potentials applied to the auxiliary electrodes 546 and/or the exit lens 550*a* may be adjusted (e.g., automatically under the control of a controller and/or as selected by the user) such that ions received by the ion guide 542 are accelerated therethrough. For example, as discussed otherwise herein, because the differential mobility spectrometry device 532 is now filtering the ions received from the ion source based on their differential mobilities in FIG. 5B, one would expect the ion flux within ion guide 542 to be lower relative to that of FIG. 5A. Rather than provide an extended pause between each $SV_1$-$COV_{1 \ldots n}$ combination as in conventional systems, however, ion guides in accordance with various aspects of the present teachings may beneficially mitigate the slower transit times (e.g., due to decreased space charge effect) to thereby improve the duty cycle and/or reduce cross talk contamination between groups of ions iteratively transmitted into the ion guide 542 at different SV-COV combinations. For example, a controller can cause the auxiliary electrodes 546 to be maintained at an attractive voltage (−41V) for the positive ions relative to that of the quadrupole rod set 544 such that an axial potential is generated along the axis as indicated in the potential plot at the bottom of FIG. 5B. Those skilled in the art will appreciate that adjusting the auxiliary electrode voltages to lower values can increase the effective axial potential generated along the axis and can be beneficial in some applications.

Additionally, in various aspects, FIG. 5B depicts that the potential applied to the exit lens 550*a* can be adjusted relative to that of the first configuration of FIG. 5A. As shown in FIG. 5B, the potential applied to the exit lens 550*a* (IQ1) has been adjusted to be more attractive to the example positive ions (e.g., +36V, +25V) relative to the offset applied to quadrupole rod set 544 (i.e., +41V) and relative to the offset applied to the stubby rods 551*a* (e.g., +39V). In this manner, the configuration of FIG. 5B allows ions to be initially accelerated through the ion guide 542. Upon being transmitted from the ion guide 542, the potential of the stubby rods 551*a* may be adjusted to ensure transmission of ions.

Figure 6:
FIG. 6 is a block diagram that illustrates a computer system, upon which embodiments of the present teachings may be implemented in accordance with various aspects of the applicant's teachings.
Figure 6:
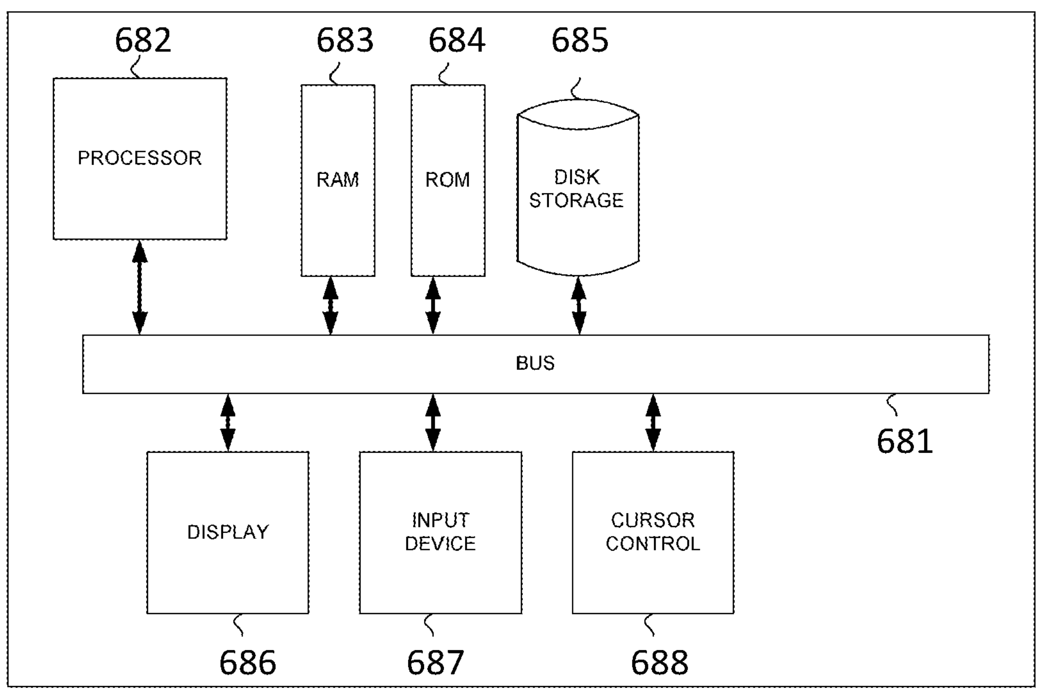

FIG. 6 is a block diagram that illustrates a computer system 680, upon which embodiments of the present teachings may be implemented. Computer system 680 includes a bus 681 or other communication mechanism for communicating information, and a processor 682 coupled with bus 681 for processing information. Computer system 680 also includes a memory 683, which can be a random access memory (RAM) or other dynamic storage device, coupled to bus 681 for storing instructions to be executed by processor 682. Memory 683 also may be used for storing temporary variables or other intermediate information during execution of instructions to be executed by processor 682. Computer system 680 further includes a read only memory (ROM) 684 or other static storage device coupled to bus 681 for storing static information and instructions for processor 682. A storage device 685, such as a magnetic disk or optical disk, is provided and coupled to bus 681 for storing information and instructions.

Computer system 680 may be coupled via bus 681 to a display 686, such as a cathode ray tube (CRT) or liquid crystal display (LCD), for displaying information to a computer user. An input device 687, including alphanumeric and other keys, is coupled to bus 681 for communicating information and command selections to processor 682. Another type of user input device is cursor control 688, such as a mouse, a trackball or cursor direction keys for communicating direction information and command selections to processor 682 and for controlling cursor movement on display 686. This input device typically has two degrees of freedom in two axes, a first axis (i.e., x) and a second axis (i.e., y), that allows the device to specify positions in a plane.

A computer system 680 can perform the present teachings. Consistent with certain implementations of the present teachings, results are provided by computer system 680 in response to processor 682 executing one or more sequences of one or more instructions contained in memory 683. Such instructions may be read into memory 683 from another computer-readable medium, such as storage device 685. Execution of the sequences of instructions contained in memory 683 causes processor 682 to perform the process described herein. Alternatively, hard-wired circuitry may be used in place of or in combination with software instructions to implement the present teachings. Thus, implementations of the present teachings are not limited to any specific combination of hardware circuitry and software. For example, the present teachings may be performed by a system that includes one or more distinct software modules for perform a method for analyzing ions in accordance with various embodiments (e.g., a differential mobility spectrometry module, an ion guide module, a mass filter module, a fragmentation module, an analyzer module).

In various embodiments, computer system 680 can be connected to one or more other computer systems, like computer system 680, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 682 for execution. Such a medium may take many forms, including but not limited to, non-volatile media, volatile media, and transmission media. Non-volatile media includes, for example, optical or magnetic disks, such as storage device 685. Volatile media includes dynamic memory, such as memory 683. Transmission media includes coaxial cables, copper wire, and fiber optics, including the wires that comprise bus 681.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 682 for execution. For example, the instructions may initially be carried on the magnetic disk of a remote computer. The remote computer can load the instructions into its dynamic memory and send the instructions over a telephone line using a modem. A modem local to computer system 680 can receive the data on the telephone line and use an infra-red transmitter to convert the data to an infra-red signal. An infra-red detector coupled to bus 681 can receive the data carried in the infra-red signal and place the data on bus 681. Bus 681 carries the data to memory 683, from which processor 682 retrieves and executes the instructions. The instructions received by memory 683 may optionally be stored on storage device 685 either before or after execution by processor 582.

The descriptions herein of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, though the present teachings may be implemented as a combination of hardware and software or in hardware alone. The present teachings may be implemented with both object-oriented and non-object-oriented programming systems.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A method for analyzing ions, comprising:

receiving in an ion guide, a first plurality of ions transmitted from a differential mobility spectrometry device while having a first combination of separation voltage and compensation voltage applied thereto, wherein the ion guide comprises a multipole rod set extending along a longitudinal axis from an inlet end to an outlet end and a plurality of auxiliary electrodes;

receiving in the ion guide, a second plurality of ions transmitted by the differential mobility spectrometry device while having a second combination of separation voltage and compensation voltage applied thereto, wherein at least one of the separation voltage and compensation voltage in the second combination differs from the separation voltage and compensation voltage in the first combination; and while transmitting the first and second plurality of ions through the ion guide, applying a DC voltage to the auxiliary electrodes so as to generate an axial electric field along a longitudinal axis of the ion guide.

2. The method of claim 1, wherein a duration between terminating transmission of the first plurality of ions and initiating transmission of the second plurality of ions is less than about 30 ms.

3. The method of claim 1, wherein a duration between terminating transmission of the first plurality of ions and initiating transmission of the second plurality of ions is less than about 10 ms.

4. The method of claim 1, wherein the ion guide is disposed in a vacuum chamber having a pressure in the mTorr range.

5. The method of claim 1, wherein the axial electric field generated by the auxiliary electrodes is removed when transmitting ions through the differential mobility spectrometry device operating in a transmission mode in which ion mobility filtering is disabled.

6. The method of claim 5, wherein removing the axial electric field comprises adjusting the DC voltage applied to the auxiliary electrodes to be substantially the same as a DC offset of the multipole rod set of the ion guide.

7. The method of claim 5, further comprising adjusting a potential on a lens adjacent the outlet end of the ion guide such that the lens is more attractive to the ions relative to an offset of the multipole rod set of the ion guide.

8. The method of claim 1, wherein the multipole rod set is a quadrupole rod set.

9. The method of claim 1, wherein the multipole rod set comprises a first pair of rods and a second pair of rods to form a quadrupole rod set and wherein the rods of the quadrupole rod set are spaced apart from the longitudinal axis such that the rods of each of the first pair of rods and second pair of rods are disposed on opposed sides of the longitudinal axis, and wherein the plurality of auxiliary electrodes comprise at least a pair of auxiliary electrodes extending along the longitudinal axis on opposed sides thereof, wherein each of the auxiliary electrodes is interposed between a single rod of the first pair of rods and a single rod of the second pair of rods.

10. The method of claim 1, wherein the auxiliary electrodes have a T-shaped cross-sectional shape.

11. A mass spectrometry system, comprising:

a differential mobility spectrometry device, wherein when activated, the differential mobility spectrometry device is configured to separate ions based on their differential mobilities;

an ion guide configured to receive ions from the differential mobility spectrometry device, wherein the ion guide comprises:

a multipole rod set extending along a longitudinal axis from an inlet end to an outlet end; and a plurality of auxiliary electrodes; and a control system operatively coupled to the differential mobility spectrometry device and the ion guide, the control system configured to:

cause a first combination of separation voltage and compensation voltage to be applied to the differential mobility spectrometry device so as to transmit a first plurality of ions;

cause a second combination of separation voltage and compensation voltage to be applied to the differential mobility spectrometry device so as to transmit a second plurality of ions, wherein at least one of the separation voltage and compensation voltage in the second combination differs from the separation voltage and compensation voltage in the first combination; and cause a DC voltage to be applied to the auxiliary electrodes while transmitting the first and second plurality of ions through the ion guide so as to generate an axial electric field along a longitudinal axis of the ion guide.

12. The mass spectrometry system of claim 11, wherein a duration between terminating transmission of the first plurality of ions and initiating transmission of the second plurality of ions is less than about 30 ms and, optionally, less than about 10 ms.

13. The mass spectrometry system of claim 11, wherein the ion guide is disposed in a vacuum chamber having a pressure in the mTorr range.

14. The mass spectrometry system of claim 11, wherein the control system is further configured to:

cause the differential mobility spectrometry device operating in a transmission mode in which ion mobility filtering is disabled; and adjust the DC voltage applied to the auxiliary electrodes when operating in transmission mode to remove the axial electric field generated by the auxiliary electrodes.

15. The mass spectrometry system of claim 14, wherein the control system is configured to adjust the DC voltage applied to the auxiliary electrodes to be substantially the same as a DC offset of the multipole rod set of the ion guide when operating in transmission mode.

16. The mass spectrometry system of claim 11, further comprising a lens disposed adjacent the outlet end of the ion guide, wherein the control system is configured to adjust a potential on the lens such that the lens is more attractive to the ions relative to an offset of the multipole rod set of the ion guide.

17. The mass spectrometry system of claim 11, wherein the multipole rod set is a quadrupole rod set.

18. The mass spectrometry system of claim 11, wherein the multipole rod set comprises a quadrupole rod set comprising a first pair of rods and a second pair of rods and wherein the rods of the quadrupole rod set are spaced apart from the longitudinal axis such that the rods of each of the first pair of rods and second pair of rods are disposed on opposed sides of the longitudinal axis, and wherein the plurality of auxiliary electrodes comprise a pair of auxiliary electrodes extending along the longitudinal axis on opposed sides thereof, wherein each of the auxiliary electrodes is interposed between a single rod of the first pair of rods and a single rod of the second pair of rods.

19. The mass spectrometry system of claim 11, wherein a distance between an innermost surface of the auxiliary electrodes and the longitudinal axis of the ion guide decreases along a length of the ion guide.

20. The mass spectrometry system of claim 11, wherein the auxiliary electrodes have a T-shaped cross-sectional shape.

* * * * *